March 8, 1927.
H. F. KOEPPE
TANK
Filed Sept. 29, 1926
1,620,471
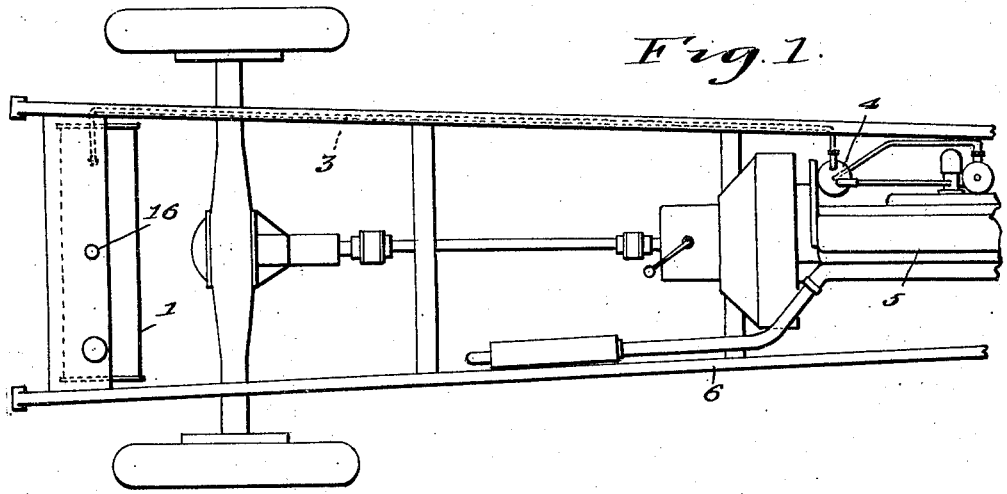
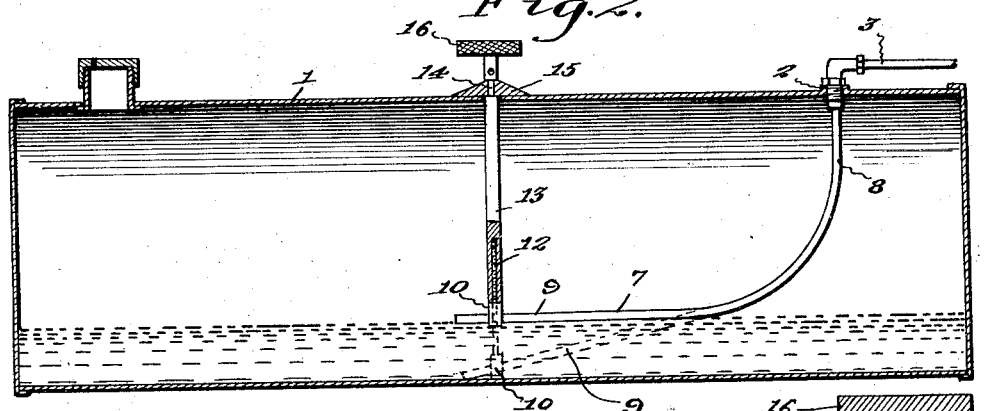
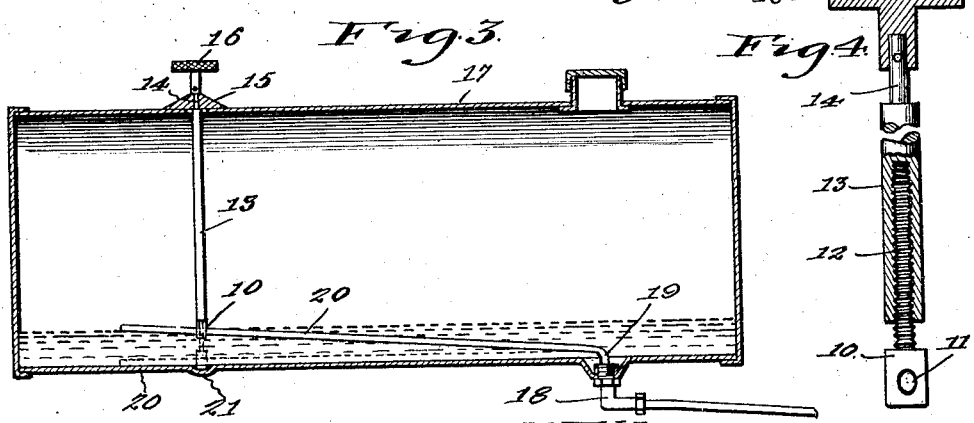
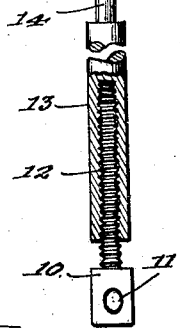
H. F. Koeppe, INVENTOR
BY Victor J. Evans, ATTORNEY Patented Mar. 8, 1927.

1,620,471

UNITED STATES PATENT OFFICE.

HERMAN F. KOEPPE, OF DETROIT, MICHIGAN.

TANK.

Application filed September 29, 1926. Serial No. 138,491.

My present invention has reference to gasoline storage or supply tanks for automobiles and like motor driven vehicles.

An object is the provision in a gasoline supply tank of means operable from the exterior of the tank for regulating the quantity of gasoline withdrawn from the tank, the same being in the nature of an emergency device whereby the quantity of the fuel below the level of that withdrawn may still be employed for operating the engine to propel the vehicle a desired distance to a fuel or supply station for replenishing the supply of fluid to the tank.

A further object is to arrange in a gasoline supply tank for vehicles, a spring tube or pipe having one end coupled to the outlet of the pipe and its other end connected to adjustable means operable from the exterior of the tank whereby the inlet end of the tube may be arranged at any desired elevation with respect to the bottom of the tank so that the fluid below such inlet end will be reserved for emergencies, the inherent spring quality of the tube normally sustaining the outlet end thereof in contact with the bottom of the tank.

A still further object is the provision of means for retaining a reserve quantity of fuel in a gasoline tank of a nature and construction to permit of the same being applied to the supply tank of any ordinary automobile construction and which device embodies the desirable features of simplicity in construction, cheapness in manufacture and application and thorough reliability and efficiency in practical use.

To the attainment of the foregoing objects and others which will appear as the nature of the invention is better understood, the improvement resides in the novel features of construction, combination and operative association of parts, one satisfactory embodiment of which is disclosed by the accompanying drawings.

In the drawings:

Figure 1 is a plan view of a sufficient portion of the frame or chassis of an automobile to illustrate the application of my improvement thereon.

Figure 2 is an approximately central longitudinal sectional view through a gasoline supply or storage tank of the type employed on automobiles provided with vacuum tanks.

Figure 3 is a similar view illustrating the application of the improvement in connection with the supply tanks of automobiles having a gravity feed.

Figure 4 is a side elevation, with parts in section, of the adjusting or regulating means for the spring pipe or tube.

In Figure 1 of the drawings I have illustrated a sufficient portion of the chassis of an automobile having a vacuum gasoline feed, and in Figure 2 I have shown the supply tank for this type of automobiles. The tank 1 is of the usual construction, the same having a normally closed filler spout at the top thereof and also an outlet opening in which is threaded an elbow 2 that has its outer end connected to the usual supply tube 3 leading to the vacuum tank 4 for the engine 5 of an automobile 6.

In carrying out my invention I screw or otherwise secure on the inner branch of the elbow 2 one end of a spring tube or pipe 7. It is to be noted that the ends of the tube 7 are straight and that the tube is rounded between its said straight ends. For distinction the branch of the tube connected to the elbow is indicated by the numeral 8, and its outer branch by the numeral 9. The branch 9 is designed to spring away from the branch 8 and therefore the inlet end of the tube 7 will normally frictionally contact with the bottom of the tank 1. When in this position the gasoline in the tanks is sucked therefrom into the vacuum tank and from thence into the engine cylinders in the usual manner.

In order that a reserve supply of gasoline may be retained in the tank, I slip over the outlet end or the branch 9 of the spring tube 7 a head member 10 provided with a somewhat elongated opening 11 therethrough, the tube passing through the said opening. The head is formed with a somewhat elongated threaded stem 12, and this stem is screwed in a threaded socket member 13. The outer end of the socket member has a reduced cross sectionally rounded extension 14 that passes through an opening in the top of the tank and also passes through a central opening in a conical dial carrying member 15. The extension 14 has its outer end secured to a milled head or knob 16 and which head, or the shank thereof may be provided with an indicator mark to align with the indicia on the dial 15. By turning the head 16 in one direction it will be apparent that the inlet end 9 of the tube 7 will be raised above the bottom of the tank, and the indicia on the dial will indicate to what extent the said end of the tube has been raised above the said bottom of the tank. Of course, the fuel above the elevated end of the tube 7 will be fed to the engine cylinders, or rather first to the carbureter in the usual manner. When the gasoline has been consumed to the level disclosed by Figure 2 of the drawings the operator of the car, knowing he has a reserve supply of gasoline sufficient to operate the motor to propel the vehicle a determined distance, turns the head 16 to lower the end 9 of the pipe 7 in the tank. Thus by my simple construction and arrangement of parts the liability of an automobile being stalled for want of gasoline at a distance away from a supply station will be effectively and easily overcome.

In Figure 3 of the drawings the tank 17 is of the type employed in connection with automobiles having the gravity gasoline feed for the motors thereof. The outlet for the gasoline is therefore arranged at the bottom of the tank 17. Screwed in this outlet there is the usual elbow 18 to whose outer branch is connected the usual feed pipe for the carbureter of the motor, and whose inner branch has connected thereto the angle end 19 of a spring pipe or tube 20. In this instance the inlet end of the tube 20 is designed to spring downwardly in the tank 17 to rest against the bottom thereof, while the same means heretofore described, and best illustrated by Figure 4 of the drawings is employed for springing the pipe 20 upwardly in the tank to arrange the inlet end of the said tube or pipe 20 at an elevation to retain a reserve supply of gasoline in the tank. In order that the pipe or tube 20 may snugly contact with the lower wall of the tank 17 the latter is formed with an outwardly bulged portion 21 for the reception of the lower end of the head 10 of the operating means.

The simplicity of my construction and the advantages thereof will, it is thought, be perfectly apparent to those skilled in the art to which this invention relates when the foregoing description has been carefully read in connection with the accompanying drawings, but obviously I do not wish to be restricted to the precise details of the improvement as herein disclosed, and therefore hold myself entitled to make all such changes therefrom as fairly fall within the scope of what I claim, providing such changes do not depart from the spirit or sacrifice any of the advantages of the invention.

Having described the invention, I claim:—

The combination with a gasoline supply tank for internal combustion motors, and a curved spring tube having straight ends, one of which is connected to the outlet for the tank and the other end designed to spring into frictional contact with the bottom of the tank and means for raising the last mentioned end, including a headed member having an elongated opening through which the last mentioned end of the tube is freely passed, a threaded shank extension on said headed member, a socket screwed on the stem, said socket having a reduced part that passes through the top of the tank, a dial on the tank surrounding the last mentioned part of the socket member and a head removably secured on the last mentioned part of the socket member and disposed over the dial.

In testimony whereof I affix my signature.

HERMAN F. KOEPPE.